United States Patent [19]

Lukich

[11] 3,948,542
[45] Apr. 6, 1976

[54] BICYCLE WITH AUXILIARY SEAT DRIVE

[76] Inventor: Aleksander Lukich, 1005 Hill St., Apt. 2, Santa Monica, Calif. 90405

[22] Filed: Feb. 13, 1975

[21] Appl. No.: 549,729

[52] U.S. Cl............... 280/226 R; 74/372; 280/223; 280/238; 280/254
[51] Int. Cl.² ......................................... B62M 1/20
[58] Field of Search............ 280/226 R, 226 A, 220, 280/221, 223, 236, 237, 238, 245, 254; 74/333, 372

[56] References Cited
UNITED STATES PATENTS

| | | | |
|---|---|---|---|
| 501,381 | 7/1893 | Taylor | 74/372 |
| 587,318 | 8/1897 | Lilly | 280/254 |
| 594,417 | 11/1897 | McGowan | 280/223 |
| 596,695 | 1/1898 | Corliss | 74/372 |
| 1,102,427 | 7/1914 | Morgan | 74/372 |
| 3,125,894 | 3/1964 | Juy | 280/238 |

FOREIGN PATENTS OR APPLICATIONS

| | | | |
|---|---|---|---|
| 87,142 | 12/1919 | Switzerland | 280/226 R |
| 26,453 | 1903 | United Kingdom | 280/226 R |
| 86,965 | 3/1920 | Switzerland | 280/226 R |
| 1,139,402 | 5/1956 | Germany | 280/221 |

*Primary Examiner*—Robert R. Song
*Assistant Examiner*—J. D. Rubenstein
*Attorney, Agent, or Firm*—Ralph B. Pastoriza

[57] ABSTRACT

Additional propelling power for a bicycle is provided by mounting the bicycle seat to reciprocate in an up and down direction and converting this motion into rotary motion by a ratchet gear. Rotation of this ratchet gear takes place when the seat moves down under the weight of the bicycle rider, a compression spring returning the seat to its up position when the rider lifts his weight from the seat. The motion of the ratchet gear is imparted to the rear wheel of the bicycle through a gear train which amplifies the rotary motion and further which may be provided with a gear shift mechanism for varying the number of rear wheel rotations imparted for one down stroke of the bicycle seat. The auxiliary seat drive is provided in addition to the conventional pedal drive sprocket and chain arrangement normally provided on bicycles.

8 Claims, 7 Drawing Figures

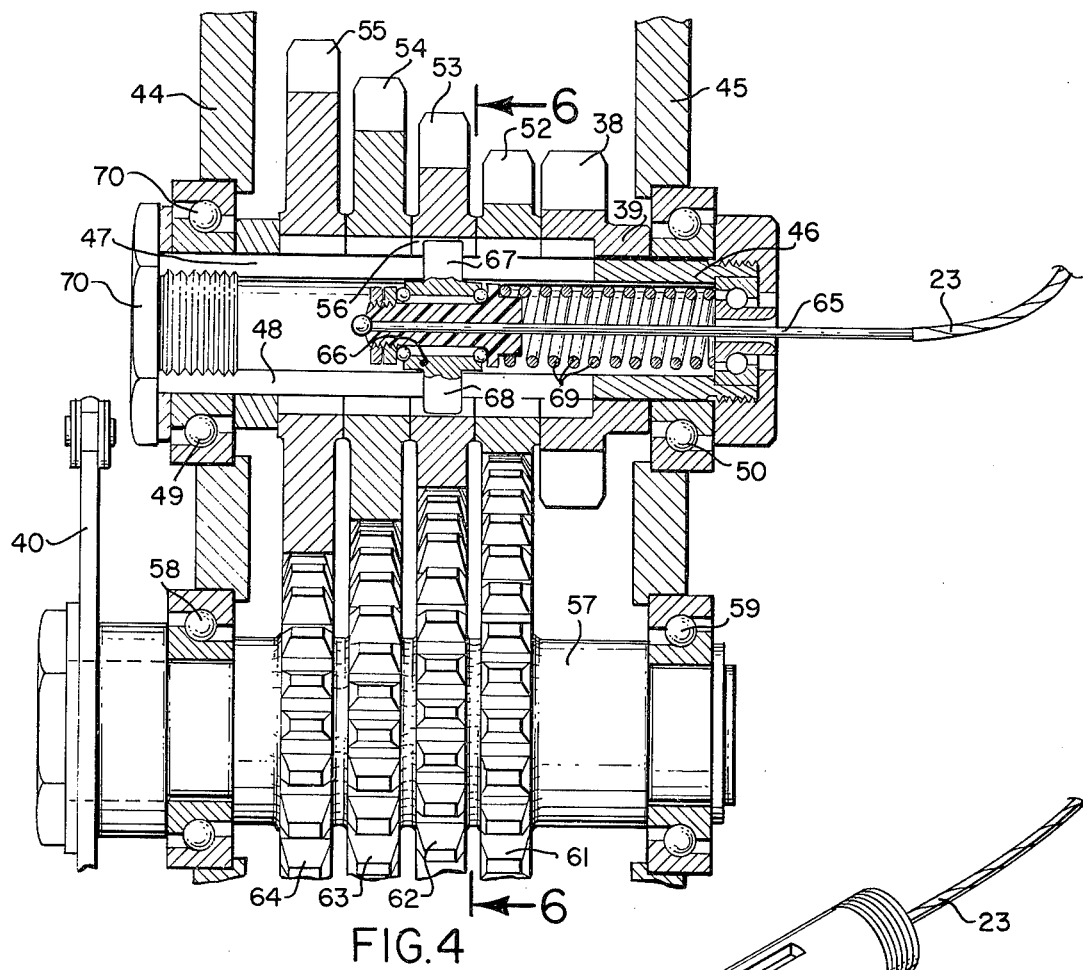
FIG. 4
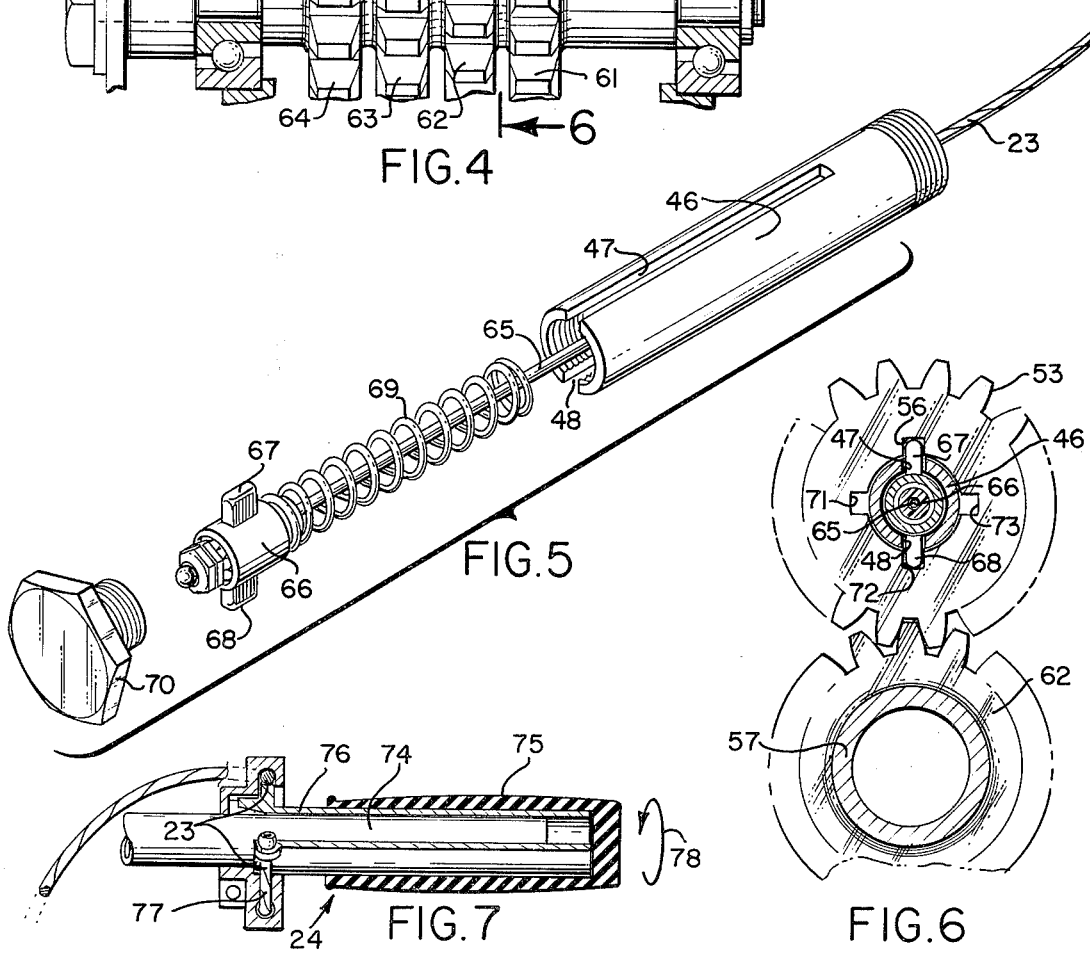
FIG. 5
FIG. 7
FIG. 6

BICYCLE WITH AUXILIARY SEAT DRIVE

This invention relates to bicycles and more particularly to a bicycle provided with an auxiliary drive operated by up and down motion of the bicycle seat.

BACKGROUND OF THE INVENTION

In operating a conventional bicycle, a bicycle rider will many times raise himself from the bicycle seat in order to exert a greater downward force on the drive pedals, after which he will relax himself on the bicycle seat. Even though such action is not as necessary with bicycles equipped with gear shifts, a bicycle rider nevertheless will often shift his position on the seat and thus many times raise and lower his body throughout long trips if for no other reason than his comfort.

The foregoing raising and lowering of the bicycle rider's body from the seat represents in certain instances a loss of available energy, particularly when such motion takes place while the bicycle is coasting and the bicycle rider is simply making himself more comfortable. It would be an advantage if such wasted energy could be utilized in aiding the forward propelling force applied to the bicycle.

BRIEF DESCRIPTION OF THE PRESENT INVENTION

With the foregoing in mind, the present invention contemplates a bicycle structure incorporating an auxiliary seat drive wherein the weight of the bicycle rider on the seat can be advantageously employed to impart additional propelling force to the bicycle.

More particularly, the bicycle of this invention includes the usual frame with front and rear wheels, a pedal drive, rear drive sprocket and interconnecting chain to the pedal drive. In addition, the bicycle seat itself is mounted to the frame for generally up and down movement relative to the frame. A gear ratchet means mounted on the frame is coupled to the seat in such a manner as to convert the downward movement of the seat into a rotary gear motion. An auxiliary drive sprocket is coupled to the rear wheel, preferably on the opposite side of the rear wheel from the conventional drive sprocket driven by the pedals. A transmission means including a gear train connects the gear ratchet means to the auxiliary drive sprocket so that the weight of a bicycle rider on the seat moving it downwardly imparts driving force to the rear wheel.

The seat itself is spring biased in an upward direction so that when the bicycle rider raises himself by standing on the pedals, the seat will follow this motion. Thus, when the driver relaxes himself on the seat his weight will urge the seat downwardly to impart again a driving motion to the rear wheel.

In the preferred embodiment of the bicycle of this invention, there is included a gear shift arrangement between the transmission gear train and the auxiliary drive sprocket so that the number of rotations imparted to the rear wheel for one downward stroke of the bicycle seat can be changed.

BRIEF DESCRIPTION OF THE DRAWINGS

A better understanding of this invention will be had by referring to the accompanying drawings in which:

FIG. 4 is an enlarged fragmentary cross section taken in the direction of the arrows 4—4 of FIG. 3;

FIG. 5 is an exploded perspective view of certain components making up part of the assembly of FIG. 4;

FIG. 6 is a fragmentary cross section taken in the direction of the arrows 6—6 of FIG. 4; and, FIG. 7 is a fragmentary perspective view of a portion of the handlebar enclosed within the circular arrow 7 of FIG. 1.

DETAILED DESCRIPTION OF THE PREFERRED EMBODIMENT

Figures 1, 2, 3:
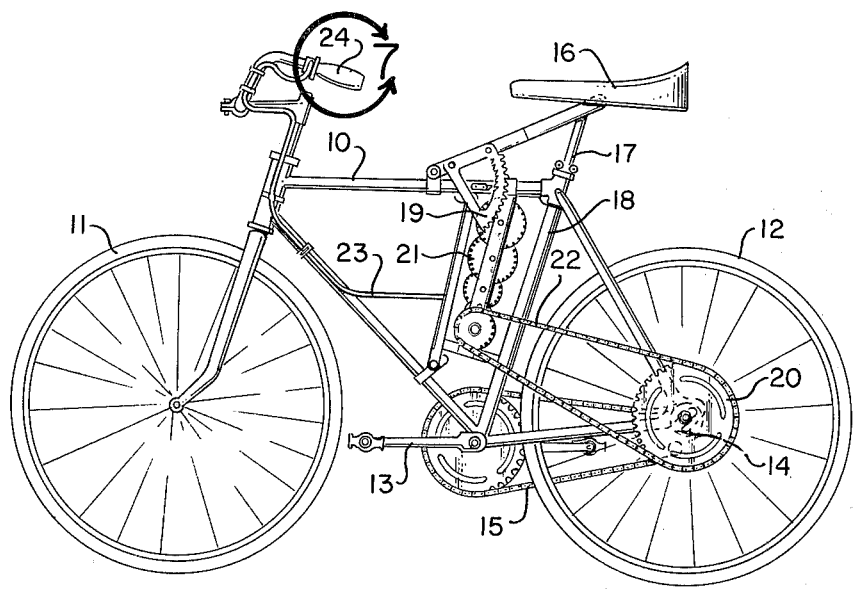
FIG. 1 is a side elevational view of the bicycle of this invention incorporating the auxiliary seat drive.
FIG. 2 is an enlarged fragmentary view partly in cross section showing the seat drive portion of the bicycle in greater detail.
FIG. 3 is another enlarged fragmentary view looking in the direction of the arrows 3—3 of FIG. 2.

Referring to FIG. 1 there is shown a bicycle including a frame 10 rotatably mounting front and rear wheels 11 and 12. A pedal drive 13 is coupled to a drive sprocket 14, secured to the rear wheel, by a chain 15 in the usual manner.

In accord with the invention, the seat 16 of the bicycle is mounted to the frame 10 by a seat mounting means which supports the seat for generally up and down movement relative to the frame. This mounting means includes a first telescoping tube 17 secured to the seat at its upper end with its lower end telescopically received in a second tube 18 of larger diameter constituting part of the frame. A gear ratchet means 19 is mounted on the frame and coupled to the seat for converting downward movement of the seat into a rotary gear motion. This motion is transmitted to an auxiliary drive sprocket 20 mounted on the rear wheel side opposite the sprocket 14 and coupled to the gear ratchet means through a gear transmission designated generally at 21 as by an auxiliary chain 22.

In the preferred embodiment, there is included with the gear transmission means 21 a gear shift assembly arranged to be actuated by a flexible cable 23 shown in FIG. 1 extending from the lower portion of the gear transmission 21 along the frame up to the handlebar 24 so that the gear shift mechanism may be conveniently manually actuated by a bicycle rider, Essentially, the gear shift enables the bicycle rider to change the number of revolutions of the rear wheel 12 for each downward stroke of the seat 16.

All of the foregoing will be better understood by now referring to FIGS. 2 and 3. Thus, the seat mounting means shown in the upper portion of FIG. 2 includes a first horizontal sliding means in the form of rails 25 secured to the underside of the seat 16. A slide carriage 26 in turn is secured to the upper end of the first telescoping tube 17 and serves to permit back and forth movement of the seat 16 relative to the upper end of the tube 17 during up and down movement of the seat.

It will be noted that the second larger diameter tube 18 receiving the tube 17 incorporates a compression spring 27 urging the lower inner end of the tube 17 in a generally upward direction so that the seat 16 is biased to its highest position.

The gear ratchet means referred to briefly in FIG. 1 includes a lever arm 28 pivoted to the frame at one end 29 and to the seat at its other end 30. This lever arm forms an acute angle with the horizontal as shown and serves to support a sector gear 31 defining an arcuate row of gear teeth 32 lying in a vertical plane. The center of the arc of teeth on the sector gear corresponds with the pivot point 29 of the lever to the frame so that up and down motion of the seat rocks the sector gear back and forth about its center.

A ratchet gear 33 is in permanent gear meshing relationship with the teeth 32 on the sector gear 31 so that up and down motion of the seat will cause the ratchet gear 33 to rotate first in one direction and then the other. The ratchet gear 33 is ratcheted to a larger diameter gear 34 in such a manner that it will rotate the gear 34 only when the ratchet gear 33 is rotated in a counterclockwise direction as viewed in FIG. 2; that is, when the seat is moving from its uppermost to its lowermost position.

As will be evident from both FIGS. 2 and 3, the larger gear 34 constitutes the first gear in a gear train which includes a smaller gear 35 meshing with the gear 34 and coaxial with a second large gear 36 in turn meshing with a smaller gear 37 coaxial with a third larger gear 38. The third larger gear 38 constitutes essentially the last gear of the gear train the gear train itself serving to amplify substantially the rotary motion of the ratchet gear 33.

In the preferred embodiment as described in conjunction with FIG. 1, there is provided a gear shift means between the gear train and the auxiliary sprocket drive 20 secured to the rear wheel. In FIGS. 2 and 3, this gear shift means includes an input gear 39 connected to the last gear 38 of the gear train and an output sprocket 40 which connects by the chain 22 to the rear wheel auxiliary sprocket drive 20. This gear shift means will be described in greater detail as the description proceeds.

Referring once again to the upper portion of FIG. 2, it will be noted that the sector gear 31 includes a series of indents 41 forming an arc concentric with the arcuate gear teeth 32 but facing in an opposite direction. These indents are arranged to cooperate with a locking projection 42 on the frame 10 such that by moving the locking projection 42 into engagement with one of the detents 41, the seat 16 may be locked in a desired vertical position. This feature is provided in the event that the bicycle rider merely wishes to operate the bicycle in a conventional manner.

In addition to the foregoing, there is also provided on the telescoping first tube 17 supporting the seat 16 a stop collar 43 which may be adjusted to limit the downward movement of the seat, thus enabling the amplitude of the stroke to be adjusted to suit the rider.

Preferably, and as clearly shown in FIG. 3, the gear train and gear shift mechanism referred to are enclosed by left and right side plates 44 and 45 which also serve as bearing mounts for the various shafts supporting the gears in the gear train and gear shift mechanism.

Referring now to the enlarged view of FIG. 4, further details of the gear shift means will be evident. As shown, the input gear 39 is in continuous meshing engagement with the last gear 38 of the gear train. This gear 39 is coaxial with and secured to the periphery of a cylinder 46 having at least one and preferably two diametrically opposite longitudinal slots 47 and 48. The cylinder 46 is rotatably mounted between the side cover plates 44 and 45 as indicated at 49 and 50. It will be understood, accordingly, that the cylinder 46 will be rotated by the gear 39 meshing with the last gear 38 when the seat is moving downwardly. A first plurality of gears of successively increasing diameter in one direction are coaxially positioned over the cylinder as indicated at 51, 52, 53, 54 and 55. The arrangement is such that the cylinder essentially functions as a journal, each of these gears being freely rotatable on the cylinder.

Each of the gears 52 through 55 includes at least one cavity on its inner central opening, surrounding the cylinder such as indicated at 56 for the gear 53. The purpose for these cavities will become clearer as the description proceeds.

Shown below the cylinder 46 is a shaft 57 bearingly supported for rotation between the side cover plates 44 and 45 as at 58 and 59. Coaxially secured to the shaft 57 for rotation therewith is a second plurality of gears of increasing diameter in a direction opposite to the one direction of increasing diameter of the first referred to plurality of gears 52 through 55. This second plurality of gears is designated at 61, 62, 63 and 64 and are respectively in permanent meshing relationship with the gears 52 through 55. Since the gears 52 through 55 are free to rotate individually at different rates on the cylinder 46, no binding will occur as a consequence of their meshing relationship with the gears 61 through 64 even though these latter gears are permanently secured to the shaft 57. Accordingly, in the absence of some means for locking one of the gears 52 through 55 to the cylinder 46 for rotation therewith, no rotary motion will be transferred from the rotating cylinder 46 to the shaft 57.

In order to enable a selective locking of one of the gears 52 through 55 to the cylinder 46 in order that rotary motion may be imparted to the shaft 57, there is provided a plunger member 65 slidably received in the cylinder 46. A clutch member 66 in turn is rotatably mounted to the inner end of the plunger member 65 and includes at least one and preferably two diametrically opposite pins 67 and 68 extending laterally through the slots 47 and 48 respectively of the cylinder. With this arrangement, by longitudinally moving the clutch member by means of the plunger along the slots of the cylinder, the pins may be selectively received in any one of the gear cavities such as the cavity 56 of the gear 53. This action of the pin will thus lock the particular selected gear to the cylinder for rotation therewith so that the shaft 57 is positively rotated by the corresponding meshing of its associated gear with the specifically locked gear on the cylinder. In the showing of FIG. 4 wherein the gear 53 is locked by the pin 67 for rotation with the cylinder 46, the corresponding meshing gear is indicated at 62 and will rotate the shaft 57.

Because of the varying diameters of the two sets of gears on the cylinder and shaft respectively, it will be appreciated that the gear ratio is different for each of the pairs of meshing gears so that a desired change in speed of the shaft 57 can be effected by movement of the plunger 65.

In FIG. 4, a portion of the flexible cable 23 described in FIG. 1 as extending up to the handlebar is shown connected to the plunger 65 so that it will be evident that manual pulling on this cable will serve to longitudinally move the clutch member 66 within the cylinder 46.

To facilitate the foregoing motion of the clutch member in the cylinder, there is provided a compression spring 69 urging the clutch member 66 to the left as viewed in FIG. 4 so that a pull on the flexible cable 23 will serve to move the plunger to the right against the bias of the spring 69.

To facilitate assembly of the foregoing components, the opposite end of the cylinder 46 is closed off by a nut 70, the slots 47 and 48 opening out this end of the cylinder.

The foregoing can better be understood by referring to the exploded view of FIG. 5 which illustrates the nut 70 removed from the end of the cylinder 46. The plunger 65 and associated clutch member 66 with pins 67 and 68 would be inserted in the left end of the cylinder 46 as viewed in FIGS. 4 and 5, the pins 67 and 68 being received in the slots 47 and 48 and then the nut 70 secured in place. It will thus be appreciated that the clutch member 66 with the pins 67 and 68 continuously rotate with the cylinder 46 while the plunger structure 65 and compression spring 69 are always rotationally stationary.

In the cross section of FIG. 6 illustrating in front view the gear 53 of FIG. 4, it will be noted that in addition to the cavity 56 on the inside portion of the gear there are provided additional cavities 71, 72 and 73 spaced at 90°. With this arrangement, it will be evident that no more than one quarter turn of any of the gears on the cylinder is necessary to position diametrically opposite cavities in line with the longitudinal opposite slots 47 and 48 of the cylinder for receiving the pins 67 and 68.

FIG. 7 illustrates the end connection of the flexible cable 23 to the handlebar 24 referred to in FIG. 1. In the particular embodiment shown, the handlebar includes a shaft portion 74 upon which the handle grip 75 is mounted for rotation. However, there is provided sufficient friction at 76 against rotational movement such that the handlebar will be held in any rotated position. With this arrangement, the end of the flexible cable 23 may be secured to the handle grip at 77 so as to be wound up thereby upon twisting movement of the handle grip such as indicated by the arrow 78, thereby providing a desired pulling force on the flexible cable 23.

As described in conjunction with FIG. 4, this pulling force will be opposed by the compression spring 69 in the cylinder 49 but the force of the spring is not sufficient to overcome the frictional setting of the handle grip 75.

Thus rotation of the handle grip 75 in a direction to wind up the flexible cable 23 will move the clutch member 66 to the right as viewed in FIG. 4 so that a relatively low gear ratio can be selected whereas rotation of the handle grip 75 in an opposite direction to release the cable 23 permits the compression spring 69 to move the clutch member 66 to the left towards a higher gear ratio. Any other suitable means for actuating the cable 23 manually may, of course, be provided.

OPERATION

The operation of the auxiliary seat drive for the bicycle will be evident from the foregoing description. Initially it should be understood that the bicycle of FIG. 1 can be operated in a conventional manner utilizing the pedal drive 13 and normally provided sprocket 14. In fact, there may be provided the conventional bicycle gear shift for the pedal arrangement, all of which need not in any way interfere with the auxiliary seat drive of the present invention. When the bicycle is so used in a conventional manner, the seat 16 may be locked in a given elevated position as by moving the projection 42 described in FIG. 2 in a selected one of the indents 41 in the sector gear 31. This action locks the lever arm 28 at a given angle and thus prevents up or downward movement of the seat 16. Since the seat 16 cannot move upwardly or downwardly, it is also locked against sliding movement relative to the carriage 26 secured to the upper end of the telescoping tube 17 so that in all respects, the bicycle functions precisely as a normal bicycle.

When it is desired to utilize the auxiliary seat drive, the projection 42 is released from the sector gear 31 so that the seat 16 is free to move up and down. In this respect, the compression spring 27 in the second larger diameter telescoping tube 18 constituting part of the frame urges the seat 16 to its uppermost position in the absence of any weight on the seat. When the rider relaxes his weight on the seat 16, it will be telescoped downwardly, thereby rotating the lever arm 28 in a clockwise direction about the pivot point 29 as viewed in FIG. 2. The sliding arrangement of the seat 16 and rails 25 permits rearward movement of the seat relative to the top end of the tube 17 supporting the carriage 26 so that the carriage 26 and tube 17 move downwardly in a rectilinear motion while the seat 16 slides rearwardly to accommodate the arcuate movement of the pivoted end 30 of the lever arm 28.

The referred to downward movement of the seat under the bicycle rider's weight will rotate the sector gear 31 to drive the ratchet gear 33 and thus the various gears in the gear train as indicated by the various arrows in FIG. 2.

Assume, by way of example, that the gear shift clutch mechanism is set in the position illustrated in FIG. 4 so that the gear 53 is locked to the cylinder 46. In this case, the last gear 38 of the gear train of FIG. 3 will rotate the cylinder 46 as the seat and sector gear move downwardly, this rotation of the cylinder 46 being imparted to the gear 53 through the locking pins 67 and 68. Rotation of the gear 53 with the cylinder 46 will then rotate the corresponding meshing gear 62 on the shaft 57 in turn rotating sprocket 40 connecting to the chain 22 described in FIG. 1 and the auxiliary sprocket drive 20 thereby adding a further propelling force to the rear wheel 12.

When the seat reaches its lowermost position, the bicycle rider can coast along or simply raise his body from the seat by standing on the pedals thereby permitting the compression spring described in FIG. 2 to return the seat 16 to its uppermost position. This latter motion will cause the sector gear 31 to rock upwardly as viewed in FIG. 2 and rotate the ratchet gear 33 in an opposite or clockwise direction. However, because of the ratcheting of the gear 33 to the larger gear 34 in the gear train, the gear 34 will not be rotated. Subsequent relaxing of the bicycle rider of his weight on the seat will cause the seat to again move downwardly and through the gear train as described impart further propelling motion to the bicycle.

The number of revolutions of the rear wheel for a single downstroke of the seat may be varied by shifting the gears in the gear shift described in FIG. 4. As already set forth, this shifting of the gear ratio is simply accomplished by pulling on the cable 23 or alternatively relaxing the tension in the cable 23 to permit the clutch member to assume a desired longitudinal position within the cylinder. In this respect, and with reference to FIG. 4, it will be appreciated that the clutch member 66 and plunger 65 may be pulled all the way to the right as viewed in FIG. 4 to disengage the pins 67 and 68 from any of the gears 52 through 55 so that no transmission of motion occurs; that is, the gear shift is disconnected or in "neutral."

From the foregoing description, it will thus be evident that the present invention has provided a greatly improved bicycle structure wherein energy heretofore available can be utilized to aid in propelling the bicycle in a forward direction.

While only one specific embodiment of the invention has been described in detail, it will be understood that various changes can be effected without departing from the scope and spirit of the invention.

What is claimed is:

1. A bicycle with an auxiliary seat drive including, in combination:
   a. a frame;
   b. front and rear wheels rotatably mounted on said frame;
   c. a pedal drive on the frame;
   d. a rear drive sprocket coupled to the rear wheel;
   e. a chain connecting said pedal drive to the rear drive sprocket to rotate said rear wheel;
   f. a seat;
   g. seat mounting means supporting said seat for generally up and down movement relative to said frame including a first tube; horizontal sliding means secured to said seat and slidably coupled to the upper end of said first tube, a portion of said frame including a larger diameter tube telescopically receiving the lower end of said first tube; spring biasing means in said second tube urging the lower end of said first tube upwardly; a lever arm pivoted to said frame at one end and to said seat at its other end to form an acute angle with the horizontal;
   h. gear ratchet means mounted on said frame and coupled to said lever arm by a sector gear means mounted on said lever arm for converting downward movement of said seat into a rotary gear motion;
   i. an auxiliary drive sprocket coupled to said rear wheel;
   j. transmission means connecting said gear ratchet means to said auxiliary drive sprocket whereby the weight of a bicycle rider on said seat moving it downwardly imparts driving force to said rear wheel; and
   k. a series of indents on a portion of said sector gear means, said frame portion including a locking projection for insertion into any one of said detents to lock said sector gear means and thus said seat in a given position when it is not desired to use the seat drive.

2. The subject matter of claim 1, in which said sector gear means further includes an arcuate row of gear teeth in a vertical plane, the center of the arc corresponding with the pivot point of the lever arm to the frame so that up and down movement of said seat rocks said sector gear back and forth about said center, and rotates said ratchet gear means.

3. The subject matter of claim 2, wherein the series of indents in said sector gear form an arc concentric with the arcuate gear teeth.

4. The subject matter of claim 1, in which said transmission means includes a gear train amplifying the motion of said ratchet gear means; and gear shift means coupled between the last gear of said gear train and said auxiliary drive sprocket on said rear wheel to enable the gear ratio to be shifted.

5. The subject matter of claim 4, in which said gear shift means includes a cylinder having at least one longitudinal slot, rotatably mounted to said frame and coupled to said last gear for rotation thereby; a first plurality of gears successively of increasing diameter in one direction rotatably mounted on said cylinder, said cylinder functioning as a journal, each of said gears including at least one cavity on its inner central opening surrounding the cylinder; a shaft parallel to and spaced from said cylinder rotatably mounted to the frame and including a second plurality of gears of increasing diameter in a direction opposite to said one direction secured to said shaft for rotation therewith and in meshing engagement respectively with said first plurality of gears; a plunger member slidably received in one end of said cylinder; and a clutch member rotatably mounted to the inner end of said plunger member and including at least one pin extending laterally through said slot in said cylinder so that by longitudinally moving said clutch member in said cylinder, said pin may selectively be received in one of said gear cavities to lock the gear to the cylinder for rotation therewith so that said shaft is positively rotated by the corresponding meshing thereon, said shaft including an end sprocket; and a chain connecting said end sprocket to said auxiliary drive sprocket on said rear wheel.

6. The subject matter of claim 5, in which said cylinder includes two diametrically opposite slots and said clutch member includes two diametrically opposite laterally extending pins passing through said slots respectively, each of said first plurality of gears including four cavities spaced at 90° so that no more than one quarter turn of any of the gears on the cylinder is necessary to position diametrically opposite cavities in line with the diametrically opposite slots for receiving said pins.

7. The subject matter of claim 6, including a spring biasing said plunger into said cylinder and a flexible line connected to said plunger for manual operation by a bicycle rider to pull the plunger against the bias of the spring and thereby position said plunger and clutch member in accord with a desired gear ratio.

8. The subject matter of claim 7, including handlebars on said frame, one of said handlebars being rotatably mounted, said flexible line connecting to said one handlebar such that twisting of the handlebar to rotate the same exerts a pull on said flexible line to shift gears.

* * * * *